US009098357B2

(12) United States Patent
Uola et al.

(10) Patent No.: US 9,098,357 B2
(45) Date of Patent: Aug. 4, 2015

(54) METHOD AND APPARATUS FOR ACTIVITY MANAGEMENT ACROSS MULTIPLE DEVICES

(75) Inventors: Juha Uola, Tampere (FI); Lauri Paimen, Tampere (FI); Pekka Reijula, Pirkkala (FI); Mikko Kuusipalo, Kangasala (FI); Arto Nikupaavola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 13/444,437

(22) Filed: Apr. 11, 2012

(65) Prior Publication Data
US 2013/0275994 A1 Oct. 17, 2013

(51) Int. Cl.
*G06F 9/54* (2006.01)
*H04L 29/08* (2006.01)
*H04W 4/00* (2009.01)

(52) U.S. Cl.
CPC ............. *G06F 9/542* (2013.01); *H04L 67/303* (2013.01); *G06F 2209/545* (2013.01); *H04W 4/008* (2013.01)

(58) Field of Classification Search
USPC ............................ 718/103; 717/174; 713/320
See application file for complete search history.

(56) References Cited

U.S. PATENT DOCUMENTS

| 5,371,693 | A  | * | 12/1994 | Nakazoe ....................... 713/321 |
|---|---|---|---|---|
| 5,960,404 | A  | * | 9/1999 | Chaar et al. .................. 705/7.26 |
| 6,842,433 | B2 | * | 1/2005 | West et al. .................... 370/312 |
| 6,950,990 | B2 | * | 9/2005 | Rajarajan et al. ............. 715/736 |
| 7,379,959 | B2 | * | 5/2008 | Hinni et al. ................... 709/202 |
| 7,395,536 | B2 | * | 7/2008 | Verbeke et al. ............... 718/100 |
| 7,529,820 | B2 | * | 5/2009 | Eatough et al. ............... 709/223 |
| 7,532,196 | B2 | * | 5/2009 | Hinckley ....................... 345/156 |
| 7,623,892 | B2 | * | 11/2009 | Hawkins .................... 455/556.1 |
| 7,836,449 | B2 | * | 11/2010 | Elvanoglu et al. ........... 718/100 |
| 8,255,360 | B1 |   | 8/2012 | Wallace et al. |

(Continued)

FOREIGN PATENT DOCUMENTS

| EP | 1 517 489 A2 | 3/2005 |
|---|---|---|
| WO | WO-2005/121950 A2 | 12/2005 |

OTHER PUBLICATIONS

Ranganathan, A., et al.; "*Mobile Polymorphic Application in Ubiquitous Computing Environments;*" 1st Annual Conference on Mobile and Ubiquitous Systems: Networking and Services; dated 2004.

(Continued)

*Primary Examiner* — Meng An
*Assistant Examiner* — Dar-Eaum Nam
(74) *Attorney, Agent, or Firm* — Alston & Bird LLP (57) ABSTRACT

A method, apparatus and computer program product are provided to synchronize multiple devices. In regards to a method, an indication is received that a view of a task is presented by a first device. The method causes state information to be provided to a second device to permit the second device to be synchronized with the first device and to present a different view of the task than that presented by the first device. The method also receives information relating to a change in state of the task that is provided by one of the devices while a first view of the task is presented thereupon. Further, the method causes updated state information to be provided to another one of the devices to cause the other device to remain synchronized and to update a second view of the task, different than the first view of the task, that is presented.

18 Claims, 3 Drawing Sheets

(56) References Cited

U.S. PATENT DOCUMENTS

| | | | | |
|---|---|---|---|---|
| 8,442,015 | B2* | 5/2013 | Behzad et al. | 370/338 |
| 8,527,640 | B2* | 9/2013 | Reisman | 709/228 |
| 8,751,444 | B2 | 6/2014 | Wallace et al. | |
| 2007/0157234 | A1* | 7/2007 | Walker | 725/38 |
| 2007/0271334 | A1* | 11/2007 | Hinni et al. | 709/203 |
| 2008/0268828 | A1* | 10/2008 | Nagaraja | 455/419 |
| 2009/0100137 | A1* | 4/2009 | Venkitaraman et al. | 709/205 |
| 2009/0241104 | A1* | 9/2009 | Amiga et al. | 717/174 |
| 2010/0100603 | A1* | 4/2010 | Alston et al. | 709/207 |
| 2010/0130125 | A1* | 5/2010 | Nurmi | 455/41.1 |
| 2011/0055317 | A1 | 3/2011 | Vonog et al. | |
| 2012/0011511 | A1 | 1/2012 | Horvitz et al. | |
| 2012/0317194 | A1* | 12/2012 | Tian | 709/204 |
| 2013/0111493 | A1* | 5/2013 | Quigley et al. | 718/104 |

OTHER PUBLICATIONS

Sherman, E.; "*Windows surprise? Switch devices, continue tasks*;" CBS News; dated Jan. 16, 2012; retrieved on Jun. 27, 2013 from <cbsnews.com/8301-505124_162-57358826/windows-surprise-switch-devices-continue-tasks/>.

"*Distributed computing*;" Wikipedia; retrieved on Jun. 27, 2013 from <en.wikipedia.org/wiki/Distributed_computing>.

"*Gaia Active Spaces for Ubiquitous Computing*;" Project web page—University of Illinois at Urbana-Champaign; dated Jan. 10, 2012; retrieved on May 22, 2013 from web.archive.org/web/20120110053200/http://gaia.cs.uiuc.edu/index.html>.

International Search Report and Written Opinion for Application No. PCT/FI2013/050200; dated Jun. 10, 2013.

\* cited by examiner

METHOD AND APPARATUS FOR ACTIVITY MANAGEMENT ACROSS MULTIPLE DEVICES

TECHNOLOGICAL FIELD

An example embodiment of the present invention relates generally to multiple connected devices and, more particularly, to the management of tasks across multiple devices.

BACKGROUND

It has become commonplace for people to utilize a number of communication devices in their daily activities. For example, a person may utilize multiple communication devices such as a laptop computer, a mobile telephone and a tablet computer, sometimes concurrently, in order to perform various tasks. With the proliferation of digital content, the prevalence of applications and the growing importance of these communication devices with respect to people's daily activities, it is anticipated that people will utilize even more communication devices on a more frequent basis in the future.

It would be desirable for the multiple communication devices utilized by a person to interoperate with one another. In this manner, a user or an application could select the best or most readily available communication device to perform each task. However, it has proven challenging to maintain communication devices in synchronization with one another so as to facilitate the interoperability of the communication devices without requiring an undesired amount of manual effort. For example, it may take considerable user effort to determine a meaningful role for each of the communication devices. The communication device may then need to be transitioned into a particular state. Further still, in an instance in which the list of available communication devices changes, e.g. in an instance in which a communication device is added or removed from a network, the role for each device may be changed.

Techniques have been developed for device pairing, such as the pairing of a Bluetooth™ headset with a mobile telephone. However, these techniques generally apply to specific pairs of communication devices and focus on the connectivity and/or networking issues. As such, people who utilize two or more communication devices may find it challenging to commence a task, e.g., an application, utilizing one of the communication devices and then continue work on the same task utilizing another communication device since the communication devices may not be readily able to co-operate, at least not without explicit effort required of the user.

BRIEF SUMMARY

A method, apparatus and computer program product have therefore been provided according to an example embodiment in order to facilitate the sharing of a task across multiple co-operating communication devices. In this regard, the method, apparatus and computer program product of an example embodiment may facilitate the provision of the same or different views of the same task to be presented by two or more devices. Alternatively or additionally, in some example embodiments, operations, processing and/or the like may be performed by one or more of the co-operating communication devices. Additionally, the method, apparatus and computer program product of an example embodiment may facilitate sharing of state information relating to the task between the multiple devices utilized by a user and/or an application executing on the communication device to distribute the task amongst the multiple communication devices.

In one embodiment, a method is provided that comprises determining one or more current capabilities. The method of this embodiment may also include causing a local application to be launched based on the one or more current capabilities, state information for a plurality of communication devices in companionship mode and state information for a user. In some example embodiments, the local application is configured to perform at least a portion of a task.

In another example embodiment, an apparatus is provided that includes at least one processor and at least one memory including computer program code with the at least one memory and the computer program code being configured, with the at least one processor, to cause the apparatus to at least determine one or more current capabilities. The at least one memory and computer program code may also be configured to, with the at least one processor, cause the apparatus to cause a local application to be launched based on the one or more current capabilities, state information for a plurality of communication devices in companionship mode and state information for a user. In some example embodiments, the local application is configured to perform at least a portion of a task.

In a further example embodiment, a computer program product may be provided that includes at least one non-transitory computer-readable storage medium having computer-readable program instructions stored therein with the computer-readable program instructions including program instructions configured to determine one or more current capabilities. The computer-readable program instructions may also include program instructions configured to cause a local application to be launched based on the one or more current capabilities, state information for a plurality of communication devices in companionship mode and state information for a user. In some example embodiments, the local application is configured to perform at least a portion of a task.

In yet another embodiment, an apparatus is provided that includes means for determining one or more current capabilities. The apparatus of this embodiment may also include means for causing a local application to be launched based on the one or more current capabilities, state information for a plurality of communication devices in companionship mode and state information for a user. In some example embodiments, the local application is configured to perform at least a portion of a task.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided according to an example embodiment to facilitate the sharing of a task across multiple co-operating communication devices. Various types of communication devices may be synchronized including, for example, mobile telephones, personal digital assistants (PDAs), pagers, laptop computers, tablet computers, in car devices, displays, gaming systems, or any of numerous other hand held or portable communication devices, computation devices, content generation devices, content consumption devices or combinations thereof.

In some example embodiments, applications that are currently executing on a communication device may achieve a particular state in order to enable a user to accomplish a task that is distributed amongst a group of connected cooperating communication devices. The state of each application running on each of the co-operating devices, user actions, user context and the capabilities of a communication device will be used by the applications to determine the particular state that an application should achieve on a communication device. The application operating on the communication device may display an accompanying view of a certain application, perform an operation in the background, perform an operation on a user interface of a display and/or launch an additional or different application. As is described herein, to accomplish such functionality, behaviors are defined for each communication device when connection with other devices. Such behaviors enable the plurality of communication devices to complement other communication devices and to co-operate to accomplish a user task.

Figure 1:
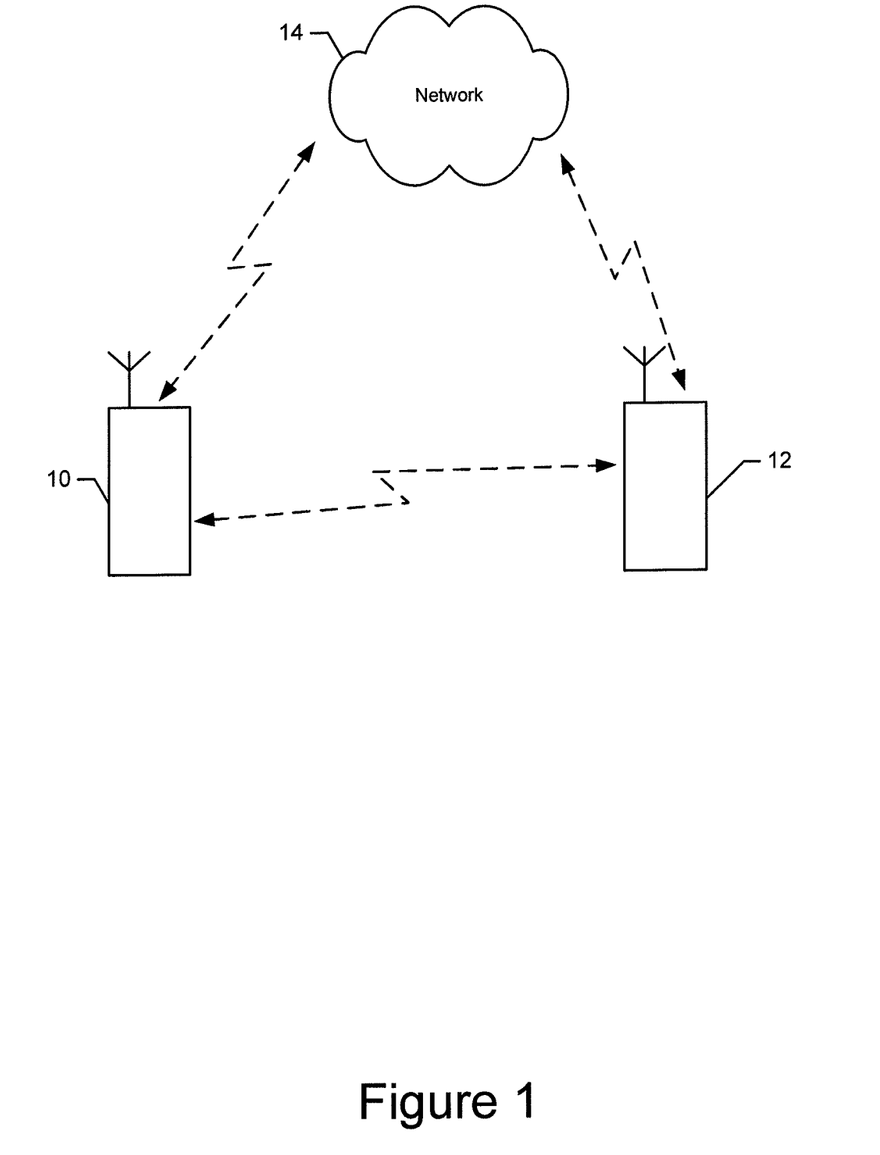
FIG. 1 is a schematic representation of first and second communication devices configured to directly communicate with one another.

The first and second communication devices 10, 12 are shown in FIG. 1 to be in direct communication with one another, such as via a wireless connection as illustrated or a wireline connection. In regards to a wireless connection, various types of wireless connections may be utilized in order to facilitate communications between the first and second communication devices including, for example, various proximity-based communications techniques, such as Wi-Fi, near field communications (NFC), BlueTooth™, worldwide interoperability for microwave access (WiMAX) or the like. In the embodiment of FIG. 1, either one or both of the communication devices may be configured to provide the task sharing functionality of the first and second communication devices. While the system of FIG. 1 is shown to include first and second communication devices, the method, apparatus and computer program product of an example embodiment may be utilized in order to cause tasks to be shared among any number of communication devices including two, three or more communication devices.

Alternatively or additionally, the communication devices may be in communication with one another in various manners. As shown in FIG. 1, for example, first and second communication devices 10, 12 are each configured to communicate with a network 14, such as via a wireless connection as illustrated or a wireline connection. Various types of networks may support communications between the first and second communication devices including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

Figure 2:
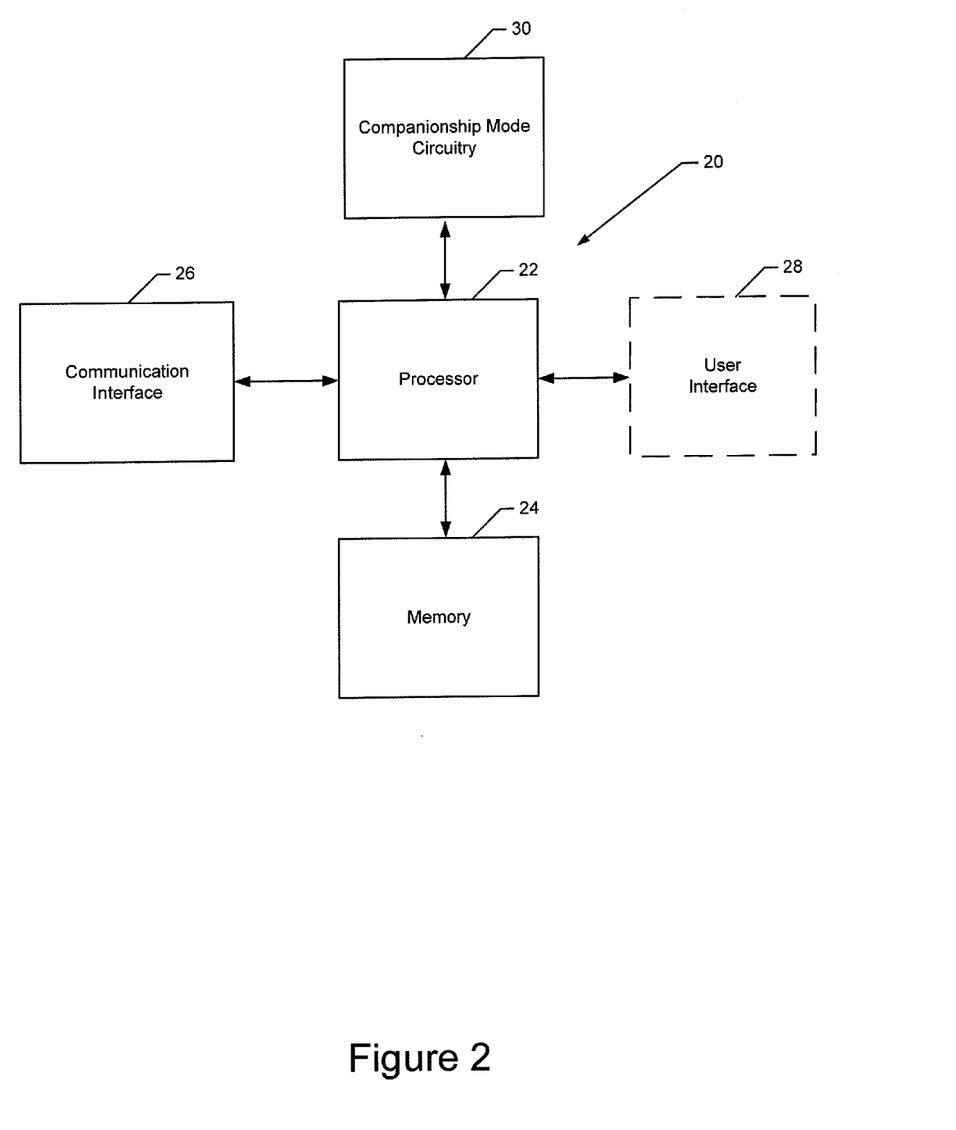
FIG. 2 is a block diagram of an apparatus that may be specifically configured in accordance with an example embodiment of the present invention.

The first and second communication device 10, 12 may each embody or otherwise be associated with an apparatus 20 that is generally depicted in FIG. 2 and that may be configured to perform various operations in accordance with an example embodiment of the present invention as described below. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26, a user interface 28 and companionship mode circuitry 30. As such, the processing circuitry may be embodied as a circuit chip (e.g., an integrated circuit chip) configured (e.g., with hardware, software or a combination of hardware and software) to perform operations described herein. However, in some embodiments taken in the context of a communication device, the processing circuitry may be embodied as a portion of the communication device.

The user interface 28 may be in communication with the processing circuitry to receive an indication of a user input at the user interface and/or to provide an audible, visual, mechanical or other output to the user. As such, the user interface may include, for example, a keyboard, a mouse, a trackball, a display, a touch screen, a microphone, a speaker, and/or other input/output mechanisms. In one embodiment, the user interface includes user interface circuitry configured to facilitate at least some functions of the station by receiving user input and providing output.

The communication interface 26 may include one or more interface mechanisms for enabling communication with other devices and/or networks. In some cases, the communication interface 26 may be any means such as a device or circuitry embodied in either hardware, or a combination of hardware and software that is configured to receive and/or transmit data from/to a network 14 and/or any other device or module in communication with the processing circuitry, such as between the first and second communication devices 10, 12 directly between the first and second communication devices in the example embodiment of FIG. 1. In the example embodiment of FIG. 1, the communication interface may be configured to transmit and receive information or other signals via a proximity-based communication protocol, such as via Wi-Fi, NFC, BlueTooth™, WiMAX or the like, so as to support communications with other proximately-located devices.

In an example embodiment, the memory 24 may include one or more non-transitory memory devices such as, for example, volatile and/or non-volatile memory that may be either fixed or removable. The memory 24 may be configured to store information, data, applications, instructions or the like for enabling the apparatus 20 to carry out various functions in accordance with example embodiments of the present invention. For example, the memory could be configured to buffer input data for processing by the processor 22 and may further be configured to store an application registry. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In some example embodiments, the companionship mode circuitry 30 may be configured to modify the use of an application operating on the first and/or second communication devices 10, 12 based on the plurality of communication devices that are in companionship mode, the states and capabilities of those devices, the user action and/or the user context. The companionship mode circuitry may further cause an application executing on a communication device to be launched, wherein the application is configured to determine a task to perform. The companionship mode circuitry may further be configured to cause the first and/or second communication devices 10, 12 to, for example, show an accompanying view of a task that is being performed on another communication device or perform other actions, such as processing or input actions, that may or may not involve the user interface 28.

The first and second communication devices 10, 12 may be configured to enter a companionship mode that is controlled, executed and/or performed by the companionship mode circuitry 30. The companionship mode, according to some example embodiments, is a state that enables the device to perform at least part of a task with another device. In other words, one or more devices may co-operate to enable a user to complete a given task. Co-operating communication devices are said to be operating in a companionship mode.

As defined herein a task may include, but is not limited to, a high level user task that may be affected by context information, a user requested operation, an instance of an executing program, an operation on the first and/or second communication devices 10, 12 and/or the like. Alternatively or additionally, various tasks may be supported and executed by a communication device, including a variety of different applications.

In this regard, the user a first communication device 10 may open or launch a task with an indication being provided that a view of the task that was opened or launched is presented by the first device and is shared with the other devices operating in companionship mode. For example, a first device can launch a calculator application and an indication may be provided to the second communication device 12 that indicates that the calculator application has been launched, thus enabling the second communication device 12 to launch, for example, a view of historical calculations for the users benefit.

As noted above, FIG. 3 is a flowchart illustrating the operations performed by a method, apparatus and computer program product, such as apparatus 20 of FIG. 2, from the perspective of the first or second communication device 10, 12, respectively, in accordance with an example embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIG. 3. It should be appreciated that each of the modifications, optional additions or amplifications below may be included with the operations above either alone or in combination with any others among the features described herein.

Figure 3:
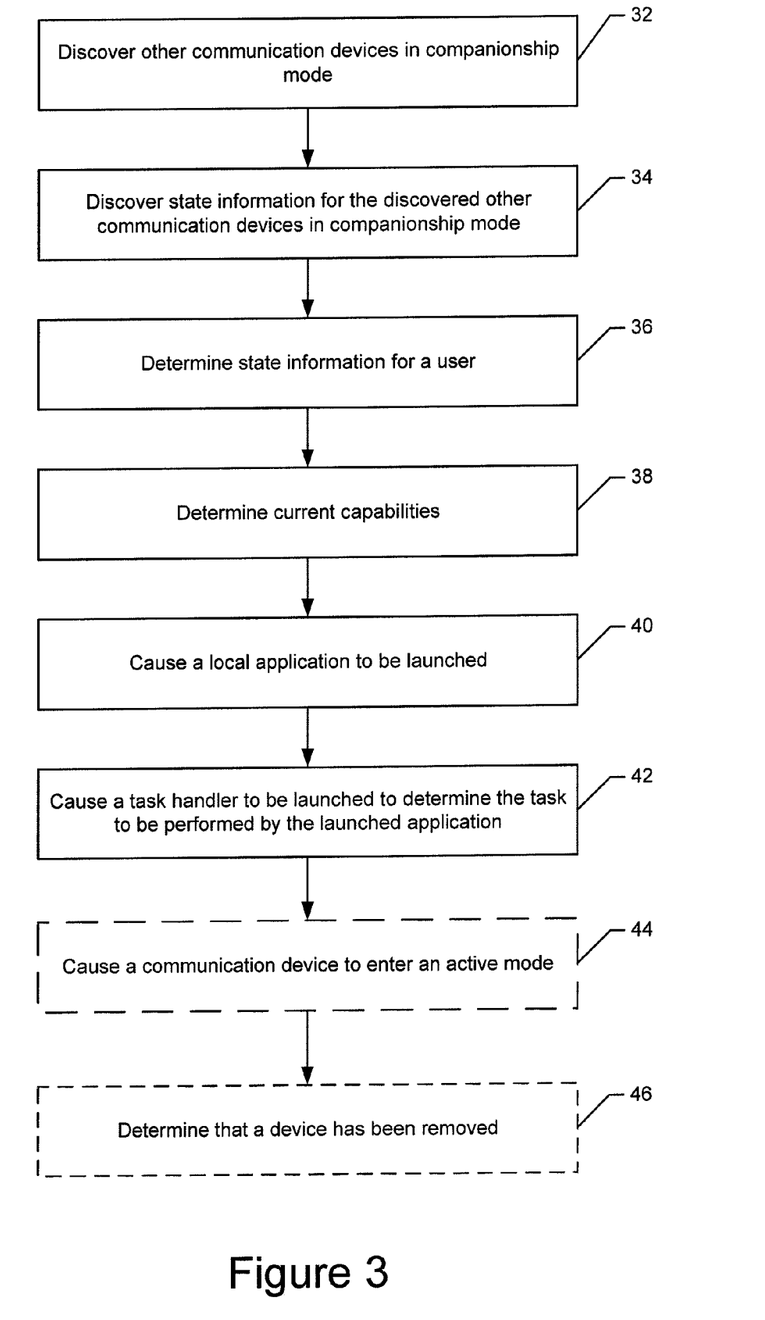
FIG. 3 is a flowchart illustrating operations performed by an apparatus embodied by a communication device in accordance with an example embodiment of the present invention.

Referring now to FIG. 3, the operations performed by an apparatus embodied as a communication device, such as the first communication device 10, are illustrated. The apparatus 20 is configured to perform various operations in response to a communication device entering or exiting a companionship mode and further based on another communication device entering or exiting companionship mode. The operations of apparatus 20 are configured to operate such that various communication devices co-operating to accomplish a user task are configured to complement each other in the execution of the task.

As is shown in operation 32, the apparatus 20 embodied by a communication device, such as the first communication device 10, may include means, such as the processor 22, the communication interface 26, the companionship mode circuitry 30 or the like, for discovering other communication devices. The other communication devices may already be in companionship mode or may be capable of entering into companionship mode. A connection may be formed with the discovered communication devices that are capable of operating in companionship mode and in fact are currently operating in companionship mode. In some example embodiments, discovery of other communication devices may include using low-level network protocols to detect all communication devices operating in companionship mode.

In some example embodiments, the first communication device 10 may form a connection with another communication device that is operating in companionship mode. Communication devices may be connected with each other in instances in which the other communication devices are operating as standalone devices in a network, for example a wireless local area network (WLAN). Alternatively or additionally, communication devices may be capable of entering companionship mode in an instance in which they are caused to collaborate together over disparate networks. Alternatively or additionally, other communication devices operating in companionship mode may be connected based on instructions by a user or based on a current context of the communication device.

In an instance in which the first and/or second communication devices 10, 12 enter a companionship mode by connecting with one or more other communication devices operating in companionship mode, the companionship mode circuitry 30, may be configured to determine, such as via the communication interface 26 or the like, the current state and capabilities of the other devices. See operation 34. In some example embodiments, a state and/or capabilities message may be received. Alternatively or additionally, the first communication device 10 may access the second communication device 12 to determine current state and compatibility information.

The processor 22, companionship mode circuitry 30 or the like may also determine a current state of a user. See operation 36. For example, a user state may include the current level of user interaction, the communication device the user last interacted with and/or the like. In this regard, the user may open or launch a task, which may then result in a view of the task that was opened or launched being presented by the first communication device 10. The user may also cause a communication device to be activated and/or cause a communication device to enter a sleep mode. Further the device that this user is currently interacting with may become the active device, and thus may receive a primary view of the task and in some example embodiments the active device may receive any prompts (e.g. an alert, a notification, a prompt or the like) received as a result of the task.

In some example embodiments, the first and second communication devices 10, 12 may be configured to determine and to share, such as by the processor 22, the communication interface 26, the companionship mode circuitry 30 and/or the like, state information and capabilities with the other communication devices operating in companionship mode. See operation 38. The state information is configured to identify the current state of a particular task. The state information may also be provided to other communication devices in a message that, for example, provides an indication that a first view of a task is presented by a first communication device 10.

In some example embodiments, state information further includes an indication of the completion status of a user task, an indication of a user interface state, an application state and a connectivity state. In some example embodiments, the connectivity state may include information related to a bearer type used to connect the one or more communication devices in companionship mode. For example, the connectivity state information may indicate the speed at which the communication device may transmit and/or receive information.

In some example embodiments the capabilities of the communication device may include, but are not limited to, applications available on the device, physical characteristics (e.g. screen size), configuration and/or the like. For example, capability information may indicate that a particular view may not be shown on a device because of the screen size and/or resolution.

As is described herein, each communication device, such as communication devices 10, 12, are configured to perform operations 32-38 in an instance in which a communication device enters into companionship mode. In some cases, operations 32-38 may be performed in an instance in which another device enters companionship mode or in an instance in which the device is first entering companionship mode.

Once the state information has been exchanged, the apparatus 20 embodied by a communication device, such as the first communication device 10, may include means, such as the processor 22, the communication interface 26, the companionship mode circuitry 30 or the like, for determining the actions to be taken with respect to the current task based on the determined state and capability information. The companionship mode circuitry 30 may be configured to determine whether the communication device should participate in a user task by accessing an application registry.

In some example embodiments, the application registry is configured to contain a list of application capabilities in the form of task handlers. The application registry may be stored in the memory 24 or may be stored remotely and thus is accessible via the communication interface 26. Using the state information (both user and other devices) and the application handler, the processor 22, the companionship mode circuitry 30 and/or the like is configured to select a companionship mode view for display via the user interface 28 and/or select an operation to be performed on the processor 22 based on the views being shown and the operations being performed on other communication devices operating in companionship mode and co-operating on the current task.

In an instance in which the communication device determines, such as by the processor 22, the companionship mode circuitry 30 or the like, to participate in the current task, a local application may be launched. See operation 40. A task handler may further be launched that is linked to the application registry to enable the application in conjunction with the processor 22 and the companionship mode circuitry 30 to determine whether to proceed with participating in a task. See operation 42. In some example embodiments, each application operating on a communication device is configured to register a task handler for one or more events, such as in the application registry. Task handlers for other communication devices may also be determined such as via the communication interface 26. Therefore, the processor 22, the companionship mode circuitry 30 or the like is configured to enable functionality on the current communication device in companionship mode based on task handlers available on the other devices. For example, an insert picture button may be disabled, if the other devices do not have the capability to take a picture.

In some example embodiments, a different application may be executing on one or more communication devices in companionship mode, in order to complete the task. For example one communication device may display contact information, another application may display a map application showing the location of the contact and yet another application may launch a phone interface in order to call the contact.

In an instance in which an application is caused to be launched, the application may proceed to select at least a portion of a task based on predefined user preferences. For example, a user preference may include configuration information that causes a navigation map to be displayed on a communication device, such as a tablet, in an instance in which a nearby communication device, such as a phone, is in navigation mode.

Alternatively or additionally, the decision to proceed with respect to a particular task may be performed by a user, such as via the user interface 28. For example, assuming a plurality of communication devices that are capable of companionship mode, a user may make a gesture (e.g. a swipe) on a first communication device, that will cause at least one of the plurality of communication devices to enter a companionship mode. Then a user, such as via the user interface 28, may select an application or other operation for the at least one communication device in companionship mode to perform. Further still, a gesture selection may cause a particular application to be launched on a communication device in companionship mode.

Alternatively or additionally, after an initial gesture, the processor 22, the companionship mode circuitry 30 or the like, may select a suitable application that will perform at least a portion of a task for the user. In some example embodiments, the suitable application may alternatively be configured to select a suitable operation and/or state based on the referenced task handlers. Alternatively or additionally, the selection of a suitable application may be performed by the processor 22, the companionship mode circuitry 30 or the like operating on a single communication device, or by a the processor 22, the companionship mode circuitry 30 or the like each operating on a plurality of communication devices in compatibility mode such that the decision process is made in a distributed fashion.

As is shown in operation 44, the apparatus 20 embodied by a communication device, such as the first communication device 10, may include means, such as the processor 22, the communication interface 26, the companionship mode circuitry or the like, for causing a communication device to become an active device. In some example embodiments, an active device is the communication device that the user last interacted with. For example the communication device that last received a key press, touch input, gesture, or has been indicated as providing the primary view. In some example cases, if a user is interacting with multiple communication devices, the active device may change rapidly. The active device may be configured such as by the processor 22, the communication interface 26, the user interface 28, the companionship mode circuitry 30 or the like, to cause information, such as prompts, alerts, status updates or the like, to be provided to the active device.

As is shown in operation 46, the apparatus 20 embodied by a communication device, such as the first communication device 10, may include means, such as the processor 22, the communication interface 26, the companionship mode circuitry or the like, for determining whether a device has been removed. In an instance in which a communication device is removed from a plurality of devices operating in companionship mode, the processor 22 or the companionship mode circuitry 30 or the like determines whether the removed device is the active device. If the user is currently operating the device that is removed, then that communication device will become the active device and will be caused to display a primary view on the user interface to enable the user to complete a task. The primary view being the view that will enable the task to be completed solely on the active devices. The other devices may continue to operate in companionship mode and may determine a new task to complete or in some example embodiments, the other communication devices may also enter a sleep mode. Alternatively or additionally, some portion of the remaining devices may determine a new task and another group may enter a sleep mode.

Alternatively or additionally, in instances in which the removed device is not the active device, the remaining devices may assume the portion of the task being performed by the removed device. For example, another device may display the view that the removed device was displaying. Once removed the device may enter a sleep mode.

As described, the method, apparatus and computer program product of example embodiments permit multiple devices to co-operate in order to perform a task. In such case, advantageously and by way of example, communication devices are configured to operate together and provide a user with an optimized experience from each device instead of operating a single device while leaving the other communication devices idle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining, for at least one of a plurality of communications devices, one or more current capabilities;
   causing a local application to be launched on at least one of the plurality of communications devices based on the one or more current capabilities, state information for the plurality of communication devices in companionship mode and user state information, wherein the current capabilities comprise available applications, physical characteristics, or configuration, wherein state information comprises task status, user interface state, application state, or connectivity state, wherein the user state information comprises a current level of user interaction with the plurality of communication devices, wherein the local application is configured to perform at least a portion of a task;
   accessing an application registry configured to identify one or more task handlers;
   causing a task handler of the identified one or more task handlers to be launched in response to identifying one or more task handlers, wherein the task handler is configured to assign the at least a portion of the task to the local application;
   causing a communication device that is not in companionship mode to enter companionship mode based on a gesture on a user interface; and
   causing at least a portion of the task to be performed by the communication device that is caused to enter companionship mode.

2. A method according to claim 1, further comprising:
   discovering other communication devices in companionship mode as part of the plurality of communication devices;
   determining state information for the other communication devices in companionship mode; and
   determining the user state information.

3. A method according to claim 1, further comprising:
   receiving, at the one of the plurality of communications devices, a selection of the local application to be launched based on at least one of a received user gesture or a predetermined user preference.

4. A method according to claim 1, further comprising:
   detecting, at the one of the plurality of communications devices, a user input;
   causing a notification to be transmitted to the other communication devices in companionship mode indicating an active communication device status; and
   receiving a user prompt from a communication device in companionship mode of the other communication devices in companionship mode.

5. A method according to claim 1, further comprising:
   causing a disconnection from a communication device in companionship mode;
   causing primary information to be displayed in an instance in which the user is interacting with a user interface; and
   causing a sleep mode in an instance in which the user is not interacting with the user interface, wherein the other communication devices in companionship mode are configured to at least one of alter the task based on the disconnection or enter a sleep mode.

6. A method according to claim 1, further comprising:
   causing an application to perform the at least a portion of the task on a communication device in companionship mode of the other communication devices in companionship mode based on at least one of a user input or the state information for the plurality of communication devices in companionship mode.

7. A method according to claim 1, wherein at least a portion of the task is performed by one or more different applications on the plurality of companionship mode devices.

8. A method according to claim 1, wherein the state information comprises at least one of a user task, a user interface state, an application state or a bearer state.

9. An apparatus comprising:
   at least one processor; and
   at least one memory including computer program code, the at least one memory and the computer program code configured to, with the at least one processor, cause the apparatus to at least:
   determine, for at least one of a plurality of communications devices, one or more current capabilities;
   cause a local application to be launched on at least one of the plurality of communications devices based on the one or more current capabilities, state information for the plurality of communication devices in companionship mode and user state information, wherein the current capabilities comprise available applications, physical characteristics, or configuration, wherein state information comprises task status, user interface state, application state, or connectivity state, wherein the user state information comprises a current level of user interaction with the plurality of communication devices, wherein the local application is configured to perform at least a portion of a task;
accessing an application registry configured to identify one or more task handlers;
causing a task handler of the identified one or more task handlers to be launched in response to identifying one or more task handlers, wherein the task handler is configured to assign the at least a portion of the task to the local application;
causing a communication device that is not in companionship mode to enter companionship mode based on a gesture on a user interface; and
causing at least a portion of the task to be performed by the communication device that is caused to enter companionship mode.

10. An apparatus according to claim 9, wherein the at least one memory including the computer program code is further configured to, with the at least one processor, cause the apparatus to:
discover other communication devices in companionship mode as part of the plurality of communication devices;
determine state information for the other communication devices in companionship mode; and
determine the user state information.

11. An apparatus according to claim 9, wherein the at least one memory including the computer program code is further configured to, with the at least one processor, cause the apparatus to:
receive, at the one of the plurality of communications devices, a selection of the local application to be launched based on at least one of a received user gesture or a predetermined user preference.

12. An apparatus according to claim 9, wherein the at least one memory including the computer program code is further configured to, with the at least one processor, cause the apparatus to:
detect, at the one of the plurality of communications devices, a user input;
cause a notification to be transmitted to the other communication devices in companionship mode indicating an active communication device status; and
receive a user prompt from a communication device in companionship mode of the other communication devices in companionship mode.

13. An apparatus according to claim 9, wherein the at least one memory including the computer program code is further configured to, with the at least one processor, cause the apparatus to:
cause a disconnection from a communication device in companionship mode;
cause primary information to be displayed in an instance in which the user is interacting with a user interface; and
cause a sleep mode in an instance in which the user is not interacting with the user interface, wherein the other communication devices in companionship mode are configured to at least one of alter the task based on the disconnection or enter a sleep mode.

14. An apparatus according to claim 9, wherein the at least one memory including the computer program code is further configured to, with the at least one processor, cause the apparatus to:
cause an application to perform the at least a portion of the task on a communication device in companionship mode of the other communication devices in companionship mode based on at least one of a user input or the state information for the plurality of communication devices in companionship mode.

15. An apparatus according to claim 9, wherein at least a portion of the task is performed by one or more different applications on the plurality of companionship mode devices.

16. An apparatus according to claim 9, wherein the state information comprises at least one of a user task, a user interface state, an application state or a bearer state.

17. A method comprising:
determining, for at least one of a plurality of communications devices, one or more current capabilities;
causing a local application to be launched on at least one of the plurality of communications devices based on the one or more current capabilities, state information for the plurality of communication devices in companionship mode and user state information, wherein the current capabilities comprise available applications, physical characteristics, or configuration, wherein state information comprises task status, user interface state, application state, or connectivity state, wherein the user state information comprises a current level of user interaction with the plurality of communication devices, wherein the local application is configured to perform at least a portion of a task;
accessing an application registry configured to identify one or more task handlers;
causing a task handler of the identified one or more task handlers to be launched in response to identifying one or more task handlers, wherein the task handler is configured to assign the at least a portion of the task to the local application; and
causing an application to perform the at least a portion of the task on a communication device in companionship mode of the other communication devices in companionship mode based on at least one of a user input or the state information for the plurality of communication devices in companionship mode.

18. An apparatus comprising:
at least one processor; and
at least one memory including computer program code, the at least one memory and the computer program code configured to, with the at least one processor, cause the apparatus to at least:
determine, for at least one of a plurality of communications devices, one or more current capabilities;
cause a local application to be launched on at least one of the plurality of communications devices based on the one or more current capabilities, state information for the plurality of communication devices in companionship mode and user state information, wherein the current capabilities comprise available applications, physical characteristics, or configuration, wherein state information comprises task status, user interface state, application state, or connectivity state, wherein the user state information comprises a current level of user interaction with the plurality of communication devices, wherein the local application is configured to perform at least a portion of a task;
access an application registry configured to identify one or more task handlers;
cause a task handler of the identified one or more task handlers to be launched in response to identifying one or more task handlers, wherein the task handler is configured to assign the at least a portion of the task to the local application; and
cause an application to perform the at least a portion of the task on a communication device in companionship mode of the other communication devices in companionship mode based on at least one of a user input or the state information for the plurality of communication devices in companionship mode.

* * * * *